United States Patent [19]

Kraemer et al.

[11] Patent Number: 5,046,075
[45] Date of Patent: Sep. 3, 1991

[54] METHOD AND ARRANGEMENT FOR ADAPTING A CLOCK TO A PLESIOCHRONOUS DATA SIGNAL AND FOR CLOCKING THE DATA SIGNAL WITH THE ADAPTED CLOCK

[75] Inventors: Horst Kraemer, Grafing-Bahnhof; Karlheinz Klinger, Munich, both of Fed. Rep. of Germany

[73] Assignee: Siemens Aktiengesellschaft, Munich, Fed. Rep. of Germany

[21] Appl. No.: 444,833

[22] Filed: Dec. 1, 1989

[30] Foreign Application Priority Data

Feb. 23, 1989 [EP] European Pat. Off. ........... 89103170

[51] Int. Cl.⁵ .............................................. H03D 03/24
[52] U.S. Cl. .................................... 375/119; 328/155
[58] Field of Search ................ 375/119, 80; 328/55, 328/63, 62, 72, 162, 155; 307/262, 269; 330/12 H R; 331/60; 329/350

[56] References Cited

U.S. PATENT DOCUMENTS 4,780,889 10/1988 Ley et al. .................... 375/119 X
4,955,040 9/1990 Sarkoezi ........................ 375/119
4,959,846 9/1990 Apple et al. ................ 375/119 X

FOREIGN PATENT DOCUMENTS 8805236 7/1988 PCT Int'l Appl. .
2069263 8/1981 United Kingdom .

Primary Examiner—Benedict V. Safourek
Assistant Examiner—Tesfaldet Bocure
Attorney, Agent, or Firm—Hill, Van Santen, Steadman & Simpson

[57] ABSTRACT

A method and an apparatus for adapting a locally-generated clock having an arbitrary phase relation to a plesiochronous data signal in which further clocks are derived from the clock via a delay line chain in such a fashion that a clock sequence having identical phase spacings is produced. These clocks are clocked by the data signal in edge-triggered D-flip-flops. The difference between the logical states of the Q outputs of two neighboring D-flip-flops provides a preselection of the best-adapted clock. Proceeding from the Q outputs and $\overline{Q}$ outputs of the D-flip-flops and the non-inverting and inverting outputs of a plurality of amplifiers, a gate arrangement connects an optimally-adapted clock to a clock output. A data signal is delayed in a delay unit by the time that the selection of the optimally-adapted clock requires. This then clocks the delayed data signal in an edge-triggered D-flip-flop.

10 Claims, 4 Drawing Sheets 5,046,075

METHOD AND ARRANGEMENT FOR ADAPTING A CLOCK TO A PLESIOCHRONOUS DATA SIGNAL AND FOR CLOCKING THE DATA SIGNAL WITH THE ADAPTED CLOCK

BACKGROUND OF THE INVENTION

1. Field of the Invention

The present invention is directed to a method and to an apparatus for adapting a clock having an arbitrary phase relation and a pulse duty factor of 1:1±10% to a plesiochronous, spike-free data signal and for clocking the data signal with the adapted clock.

2. Description of the Prior Art

In larger digital communications transmission systems, it is becoming increasingly difficult to construct a suitable clock distribution system for operation in clock-controlled synchronism given higher bit rates such as 139.264 or 155.52 Mbit/s. When, however, the required clocks are locally produced by distributed clock generators having a nominally identical frequency given an accuracy greater than $10^{-4}$, then the problem arises that the incoming plesiochronous data signals must be synchronized to the local clock.

An earlier European patent application (88117055.9) is already directed to a method for the reception of a binary data signal that may also exhibit phase skips upon utilization of a clock whose frequency is plesiochronous with or identical to the bit rate of the data signal and whose phase difference compared to the data signal is arbitrary. A sequence of clocks exhibiting approximately identical phase spacings is formed from the cock via a delay line chain, short pulses being derived from these clocks. Upon arrival of each edge of the data signal selected as effective, a potentially delayed interrogation pulse is derived with which a presence of pulses is interrogated via AND gates. When such pulses are present, then clocks selected via SR flip-flops and AND gates are through connected or are employed as read-in clocks OR operated. The overall running time of these method steps may potentially be compensated by such a delay that the effective edge of the read-in clock always appears half a period after the effective edge of the data signal.

SUMMARY OF THE INVENTION

The object of the present invention is to provide a method that can be executed in a more simple arrangement and that, in particular, is suitable for employment in integrated circuits.

The above object is achieved, according to the present invention, in a method for adapting a clock having an arbitrary phase relation and a pulse duty factor of 1:1±10% to a plesiochronous, spike-free data signal and for clocking the data signal with the adapted clock by the steps of generating a sequence of at least four clocks of identical frequency and identical phase spacings that begins with the first of the four clocks and is provided for ordering numbers, clocking of every clock by the edges of the data signal that are defined as effective, inverting every clock, amplifying every clock, amplifying and inverting every clocked clock, performing an OR operation of every clocked clock with the respective, inverted clock of the next higher ordering number, performing a NOR operation of every signal derived from the first OR operation with the respective, amplified clock and having the ordering number of the clocked clock introduced into the first OR operation, performing a second OR operation of every inverted, clocked clock with the respective clocked clock of the next higher ordering number, performing a second NOR operation of every signal deriving from the second OR operation with the respective, inverted, amplified clock having the ordering number of the inverted, clocked clock having the ordering number of the inverted, clocked clock introduced into the second OR operation, performing a third OR operation of all clocked clocks, performing a third NOR operation of the signal deriving from the third OR operation with the inverted, amplified clock of the last ordering number, performing a fourth OR operation of a inverted, clocked clocks, performing a fourth NOR operation of the signal deriving from the fourth OR operation with the amplified clock having the last ordering number, performing a fifth NOR operation of all signals deriving from the first through fourth NOR operations, this yielding the adapted clock, delaying the data signal that corresponds to the delay in the acquisition of the adapted clock, and clocking the delayed data signal with the adapted clock.

An arrangement for implementing the method may have a clock selection device and be characterized in that further edge-triggered D-flip-flops for clocking the clocks with the data signal and for generating the clocked clocks and the inverted clocks may be provided along with amplifiers for generating the amplified clocks and the inverted amplified clocks, OR gates for the OR operations and NOR gates for the NOR operations in the selection device, and that a further delay unit for delaying the data signal is provided, and in that the edge-triggered D flip-flop at the output is provided for a clocking of the delayed data signal.

The arrangement for implementing the method of the invention may comprise a chain of delay units for deriving the clocks, a clock selection device, and an edge-triggered D flip-flop at the output side, and be characterized in that further edge-triggered D flip-flops for clocking the clocks with the data signal and for generating the clocked clocks and the inverted clocks, amplifiers for generating the amplified clocks and the inverted amplified clocks, and gates for the OR operations and for the NOR operations are provided in the clock selection means, and that a further delay line is provided for delaying the data signal, and in that the edge-triggered D-flip-flop at the output side is provided for a clocking of the delayed data signal.

The arrangement may be further characterized in that the amplifiers or inverters are provided as delay units.

The arrangement may be further characterized by construction thereof in bipolar ECL technology, The arrangement may be further characterized by the use of given bit rates of the data signal of 139.264 Mbit/s and 155.52 Mbit/s.

BRIEF DESCRIPTION OF THE DRAWINGS

Other objects, features and advantages of the invention may become apparent from the detailed description below, taken in conjunction with the accompanying drawings, of which.

DESCRIPTION OF THE PREFERRED EMBODIMENTS

Figure 1:
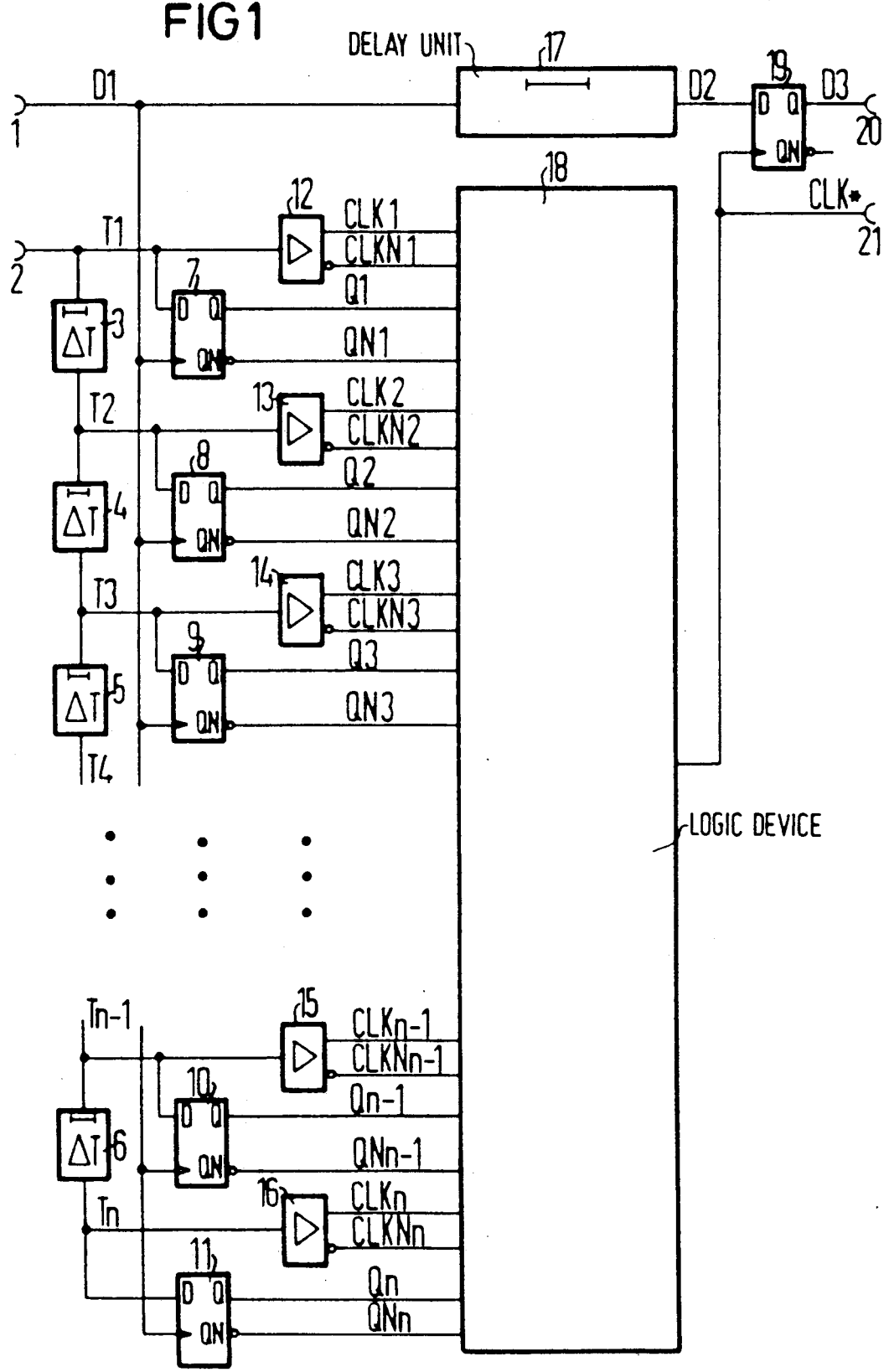
FIG. 1 is a block diagram of apparatus for carrying out the method of the invention.

FIG. 1 shows an exemplary embodiment of the arrangement of the invention. This embodiment contains delay units 3-6 and 17, edge-controlled D-flip-flops 7-11 and 19, amplifiers 12-16 and a logic device 18.

Figure 2:
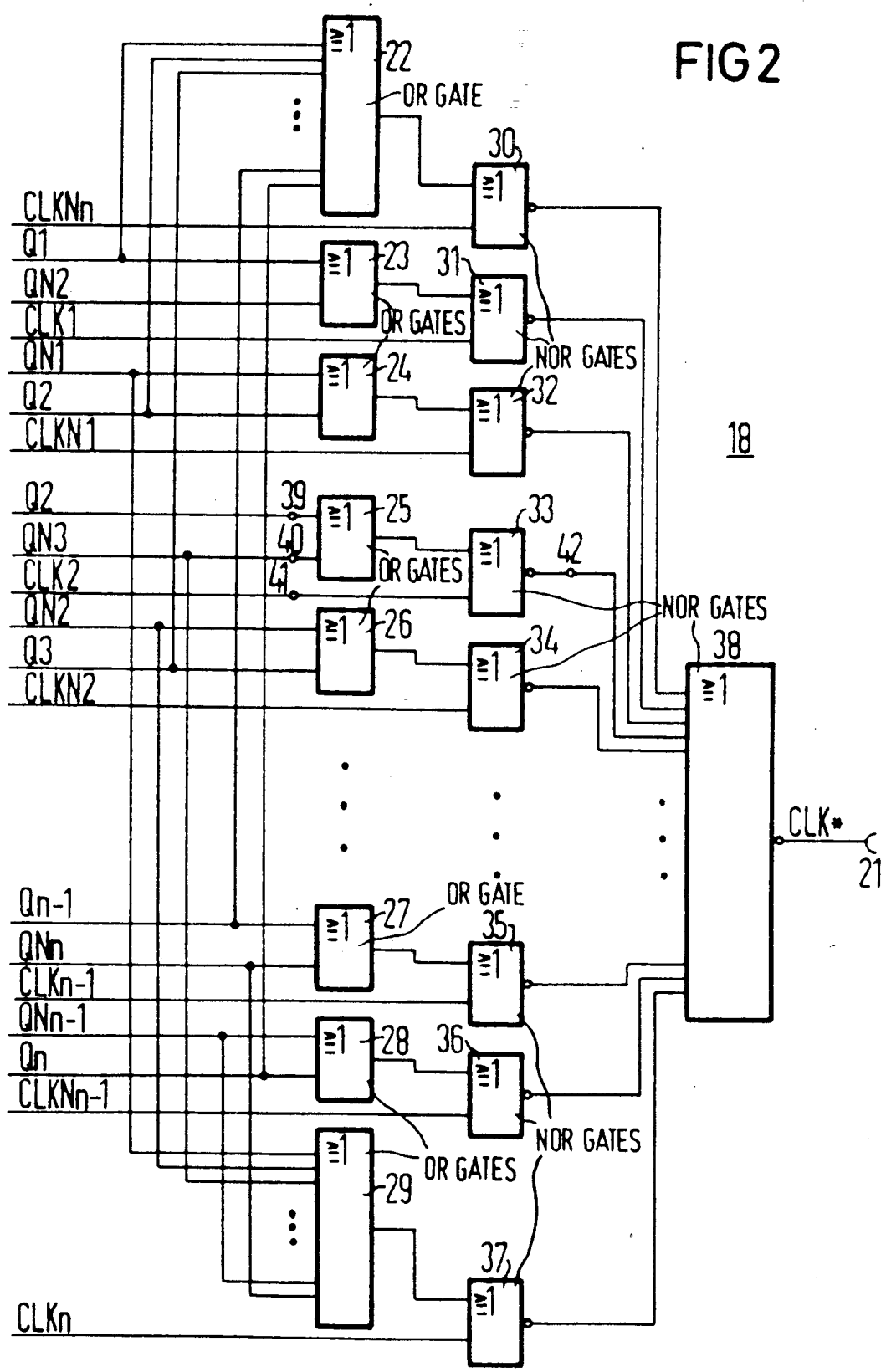
FIG. 2 is a logic representation for the arrangement of FIG. 1.

FIG. 2 shows the apparatus of FIG. 1 in detail. It contains OR gates 22-29 and NOR gates 30-38.

A plesiochronous, spike-free data signal D1 is supplied to the data signal input 1 (FIG. 1). It must contain data changes whose edges selected as effective do not fall below a maximum spacing corresponding to the frequency offset between the data signal D1 and the clock signal T1. The clock signal T1 h a clock frequency corresponding roughly to the nominal bit rate of the data signal D1 and a pulse duty factor 1:1±10% and is supplied into the clock input 2 and is first supplied to the chain of delay units 3-6. Dependent on technology and clock frequency, the delay units are realized with one or more amplifiers or inverters. Together with the clock T1 at the input side, the chain 3-6 supplies a clock sequence T1-Tn that has identical phase spacings. The sum of the phase spacings must amount to at least 60% of a clock period, corresponding to the maximum pulse or, respectively, pause duration. The minimum delay time between two clocks thus amounts to at least 1/n of the maximum pulse or, respectively, pause duration of the clock T1.

All of the clocks T1-Tn are respectively supplied to the D input of edge-triggered D-flip-flops 7-11 whose clock inputs are all connected to the data signal input D1. In this manner, the clocks T1-Tn are clocked with either the positive or the negative edges of the data signal D1. The logical status of the clocked clocks T1-Tn respectively appear; at the Q outputs of the D-flip-flops 7-11 and the inverted logical status of clocked clocks T1-Tn respectively appear at the QN outputs. The clocks T1-Tn are respectively supplied to one of the amplifiers 12-16 that output the amplified clocks CLK1-CLKn and amplified inverted clocks CLKN1-CLKNn. The clocks output by the D-flip-flops 7-11 and by the amplifiers 12-16 are supplied to the logic device 18 that is shown in detail in FIG. 2.

When the negative edges of the data signal D1 are the effective edges, then states of logical "H" (high) appear in the sequence of the D-flip-flops 7-11 at the Q output as long as the clock edges of the applied clocks T1-Tn lead the effective edge of the data signal D1. When this changes, then the Q outputs of the following D-flip-flops respectively receive a logical state of "L" (low). When the positive edges of the data signal D1 are the effective edges, then the sequence of logical states at the Q outputs of the D-flip-flops 7-11 is identical; however, the clock inverted relative to this phase relation is selected.

For example, let it be assumed that the status change at the Q outputs be between the D-flip-flops 9 and 10 and the clocked clock Q2 momentarily has a logical status of "L" and the clocked clock Q3 a logical status of "H". The inverted, clocked clock QN2 then has a logical status of "H" and the inverted clocked clock QN3 has a logical state of "L". Under these conditions, the output of the OR gate 25 has a logical state of "L" and the output of the OR gate 26 has a logical state of "H". Given this constellation, only the amplified clock CLK2 is connected through via the NOR gate 33 and the NOR gate 38 to the clock output 21 as an adapted clock CLK and to the clocked input of the D-flip-flop 19 (FIG. 1). If the clocked clock Q2 and the inverted clocked clock QN3 had logical states of "H" and the clocked clock Q3 and the inverted clocked clock QN2 each have the states of logical "L", the inverted amplified clock CLKN2 would have been connected through to the clock output 21.

The other gate groups such as, for example, 23, 24, 31 and 32 or 27, 28, 35 and 37 do not allow any clock to pass. If, due to long delay times ΔT at the delay units 3-6, both a negative as well as a positive status change are recognized, the two selected clocks are superimposed, and these are approximately identical in phase relation. The NOR operation of the clocks guarantees that no double pulse occurs. A spread of the pulse duration of the adapted clock CLK merely occurs.

All clocked clocks Q1-Qn are supplied to the OR gate 22. If, due to extremely short delay times is the delay units 3-6, no status changes recognized and all clocked clocks Q1-Qn have a logical state of "L", then the amplified inverted clock CLKNn is connected through to the clock output 21 via the NOR gates 30 and 38. All inverted clocked clocks QN1-QNn are supplied to the OR gate 29. If all inverted clocked clocks QN1-QNn should have a logic state of "L" by way of exception, then the amplified clock, CLKn is connected through to the output 21 via the NOR gates 37 and 38.

Due to a delay of the data signal D1 in the delay unit 17, the transit time of the selected clock through the amplifiers 12-16 and through the logic element 18 is compensated. The delay data signal D2 is clocked in the D-flip flop 19 with the clock CLK, and the clocked data signal D3 appears at the data signal output 20.

Referring to FIGS. 3-6, pulse diagrams are provided for eight clocks T1-T8.

Figure 3:
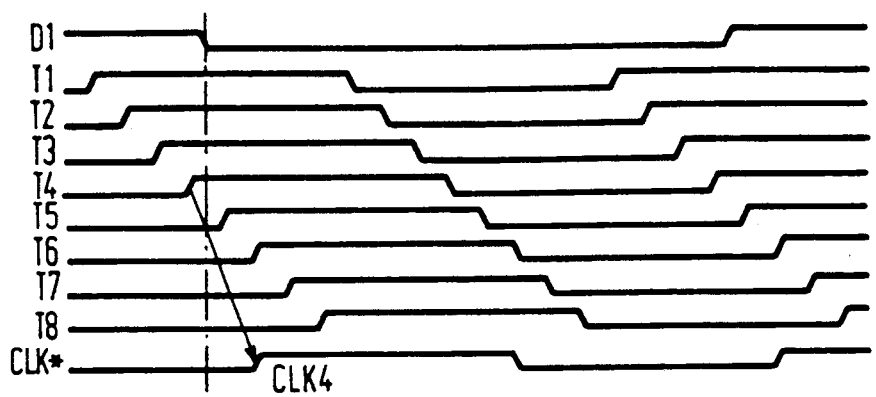
FIGS. 3-6 are pulse diagrams for explaining the operation of the arrangement of FIGS. 1 and 2.

FIG. 3 illustrates a case wherein a status change of the data signal D1 coincides with a positive clock edge. In this case, the amplified clock CLK4 is selected.

Figure 4:
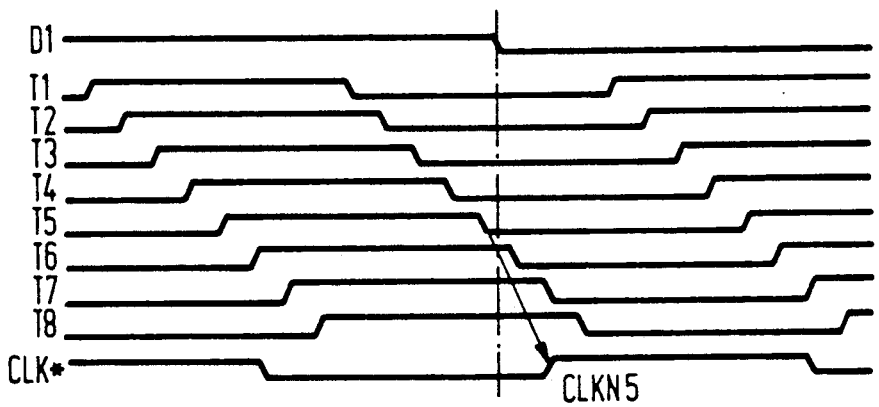

FIG. 4 illustrates a case wherein a status change of the data signal D1 coincides with a negative clock edge. In this example, the inverted amplified clock CLKN5 is sought out.

Figure 5:
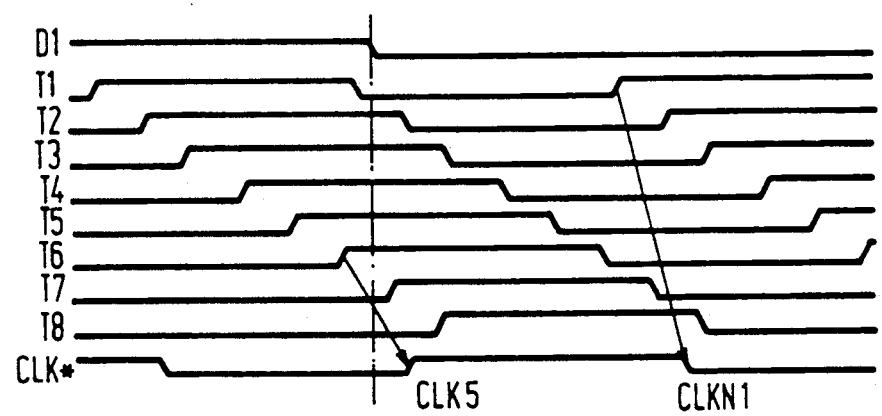

FIG. 5 illustrates a case wherein a status change of the data signal D1 coincides with two clock edges, namely those of the clocks T1 and T5. Both the amplified clock CLK5 as well as the inverted amplified clock CLKN1 are selected.

Figure 6:
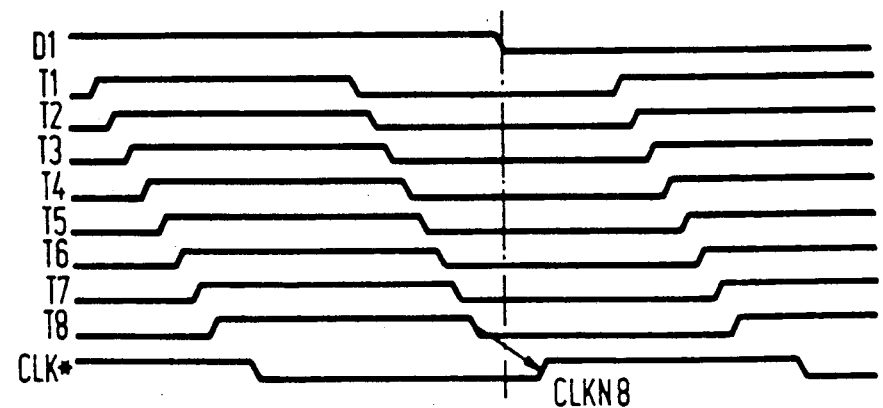

FIG. 6 shows a case wherein the status change of the data signal coincides with no edge of the clocks T1-T8. The inverted amplified clock CLKN8 is then connected through.

The described arrangement guarantees a reliable clocking of the plesiochronous data signal D1 in all instances. No data bit can be lost and no data bit can b: doubly clocked. The arrangement can adapt the clock T1 to the data signal D1 both in terms of phase relation as well as in term; of frequency. The scope of the circuit is considerably reduced by limiting the phase spacings to 60% of the clock periods.

Figure 7:
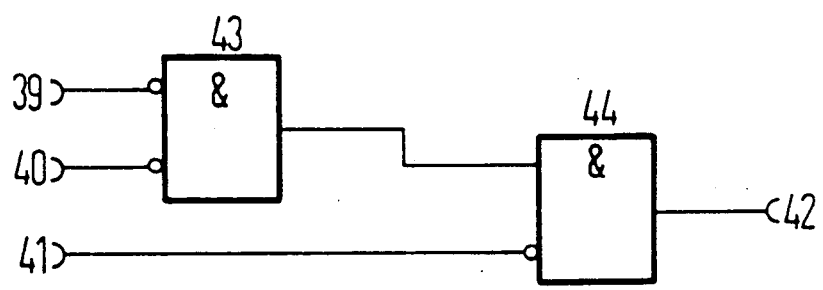
FIG. 7 is a schematic representation of an AND gate/NAND gate combination that can be substituted in the arrangement of FIG. 2.

FIG. 7 illustrates an arrangement comprising an AND gate 43 having two inverting inputs and comprising an AND gate 44 having an inverting input. With the terminals 39-42 inserted into FIG. 2, for example, this circuit can replace the OR gate 25 and the NOR gate 33. The same is true of the gate configurations 22 and 30-24 and 32, as well as 26 and 34–29 and 37. The inverting inputs of the AND gate 43 and of the AND gate 44 can be omitted when the connections between the D-flipflops 7–11 and the amplifiers 12–16 to the logic device 18 is correspondingly modified.

The arrangement is suitable for integration, for example in bipolar or in a CMOS technology, particularly for frequencies above 100 Mhz.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method of adapting a clock, having an arbitrary phase relation and a pulse duty factor of 1:1±10%, to a plesiochronous, spike-free data signal and for clocking the data signal with the adapted clock, comprising the steps of:

generating a sequence of at least four first clocks of identical frequency and identical phase spacings beginning with the first clock of the sequence and having ordering numbers;

clocking each of the first clocks by the selected edges of the data signal inverting each of the clocked first clocks;

amplifying and inverting each of the first clocks;

ORing, a first time, each of the clocked first clocks with the respective inverted clocked first clock of the next higher ordering number;

NORing each of the ORing results of the first ORing step with the respective amplified first clocks having the ordering number of the clocked first clock introduced in the ORing step;

ORing, a second time, each of the inverted clocked first clocks with the respective clocked first clock of the next higher ordering number;

NORing, a second time, each result of the second ORing step with a respective inverted amplified first clock having the ordering number of the inverted clocked first clock introduced into the second ORing step;

ORing, a third time, all of the clocked first clocks;

NORing, a third time, each result of the third ORing step with the inverted amplified first clock of the last ordering number;

ORing, a fourth time, all of the inverted clocked clocks;

NORing, a fourth time, the result of the fourth ORing step with the amplified first clock having the last ordering number;

NORing, a fifth time, the results of the first through fourth NORing steps to produce the adapted clocks;

delaying the data signal through the first through fourth ORing steps and the first through fifth NORing steps; and clocking the delayed data signal with the adapted clock.

2. Apparatus for adapting a clock, having an arbitrary phase relation and a pulse duty factor of 1:1±10%, to a plesiochronous, spike-free data signal and for clocking the data signal with the adapted clock, comprising:

a data signal input for receiving a plesiochronous data signal having leading or trailing edges selected as effective;

a clock input for receiving clock pulses;

clock generating means connected to said clock input for generating a sequence of at least four first clocks of identical frequency and identical phase spacings beginning with the first clock of the sequence and having ordering numbers;

clocking means connected to said clock generating means and to said data signal input for clocking each of the first clocks by the selected edges of the data signal that are defined effective;

amplifying and inverting means connected to said clock generating means for separately amplifying and inverting each of the first clocks;

first OR means connected to said clocking means and to said amplifying and inverting means for ORing each of the clocked first clocks with the respective inverted clocked first clock of the next higher ordering number;

first NOR means connected to said first OR means and to said amplifying and inverting means for NORing with the respective amplified first clocks having the ordering number of the clocked first clock introduced by said first OR means i the ORing step;

second OR means connected to said amplifying and inverting means and to said clocking means for ORing each of the inverted clocked first clocks with the respective clocked first clock of the next higher ordering number;

second NOR means connected to said second OR means and said amplifying and inverting means for NORing each result by said second OR means the second ORing with a respective inverted amplified first clock having the ordering number of the inverted clocked first clock introduced into the second ORing by said second OR means;

third OR means connected to said clock generating means for ORing all of the clocked first clocks;

third NOR means connected to said third OR means and said amplifying and inverting means for NORing each result of the third ORing by said third OR means with the inverted amplified first clock of the last ordering number;

fourth OR means connected to said amplifying and inverting means for ORing all of the inverted clocked clocks;

fourth NOR means connected to said fourth OR means and to said amplifying and inverting means for NORing the result of the fourth ORing by said fourth OR means with the amplified first clock having the last ordering number;

fifth NOR means connected to said first, second, third and fourth NOR means for NORing the results of the first through fourth NOR means to produce the adapted clock;

delay means connected to said data signal input for delaying the data signal through the duration of the first through fourth ORings and the first through fifth NORings; and adaptive clocking means connected to said delay means and to said fifth NOR means for clocking the delayed data signal with the adapted clock.

3. The apparatus of claim 2, wherein:

said adaptive clocking means comprises an edge-triggered D-flip-flop connected to said delay means and connected to said fifth NOR means.

4. The apparatus of claim 2, wherein: said clock generating means comprises a plurality of amplifiers connected in series.

5. The apparatus of claim 4, wherein:
each of said amplifiers comprises a delay circuit.

6. The apparatus of claim 2, wherein:
said clocking means comprises a plurality of D-flip-flops each including a trigger input connected to said data signal input and an input connected to receive a respective clock.

7. The apparatus of claim 2, wherein: said amplifying and inverting means comprises a plurality of amplifiers.

8. The apparatus of claim 2, wherein:
said first, second, third and fourth OR means together comprise a plurality of OR gates.

9. The apparatus of claim 2, wherein:
said first, second, third, fourth and fifth NOR means together comprise a plurality of NOR gates.

10. The apparatus of claim 4, wherein:
said first, second, third and fourth OR means and said first, second, third and fourth NOR means together comprise a plurality of AND/OR gate circuits each including an AND gate and an OR gate, said AND gate including inverting inputs and an output, said OR gate including a first input connected to said output of said AND gate, an output, and an inverting input.

* * * * *